United States Patent
Mitchell et al.

(10) Patent No.: US 8,345,642 B2
(45) Date of Patent: Jan. 1, 2013

(54) MOBILE COMMUNICATIONS NETWORK

(75) Inventors: Craig J. Mitchell, Hvidovre (DK); Carsten Juncker, Herlev (DK)

(73) Assignee: Renesas Mobile Corporation, Tokyo (JP)

(*) Notice: Subject to any disclaimer, the term of this patent is extended or adjusted under 35 U.S.C. 154(b) by 0 days.

(21) Appl. No.: 13/272,790

(22) Filed: Oct. 13, 2011

(65) Prior Publication Data

US 2012/0294290 A1 Nov. 22, 2012

Related U.S. Application Data

(63) Continuation of application No. 13/108,352, filed on May 16, 2011.

(30) Foreign Application Priority Data

May 16, 2011 (GB) ...................................... 1108159

(51) Int. Cl.
H04J 3/00 (2006.01)
H04J 3/08 (2006.01)
H04B 7/212 (2006.01)
(52) U.S. Cl. .......................... 370/336; 370/321; 370/326
(58) Field of Classification Search .................. 370/252, 370/310–350, 458, 464–465; 455/115.1, 455/226.1
See application file for complete search history.

(56) References Cited

U.S. PATENT DOCUMENTS

| 7,729,272 B2 * | 6/2010 | Avivi .............................. 370/252 |
| 7,978,592 B2 * | 7/2011 | Aghili et al. ................... 370/205 |
| 2002/0021687 A1 * | 2/2002 | Toki et al. ...................... 370/345 |
| 2007/0026803 A1 * | 2/2007 | Malm ........................... 455/63.1 |
| 2007/0149134 A1 * | 6/2007 | Sebire et al. ................ 455/67.11 |
| 2010/0067440 A1 * | 3/2010 | Dick et al. ..................... 370/328 |
| 2010/0254280 A1 * | 10/2010 | Jamadagni et al. ........... 370/252 |
| 2010/0279701 A1 * | 11/2010 | Chen .......................... 455/452.2 |

(Continued)

FOREIGN PATENT DOCUMENTS

EP 1 626 511 A1 2/2008

(Continued)

OTHER PUBLICATIONS

3GPP TS 45.008 V9.6.0 (Mar. 2011), "3$^{rd}$ Generation Partnership Project; Technical Specification Group GSM/EDGE Radio Access Network; Radio subsystem link control (Release 9)", 146 pgs.

(Continued)

Primary Examiner — Warner Wong
(74) Attorney, Agent, or Firm — Harrington & Smith

(57) ABSTRACT

A first user terminal receives data during a time slot assigned for simultaneous transmission of data to a first set of at least one user terminal and to a second set of at least one user terminal using time-division multiplexing, estimates the applied power ratio between a first sub-channel to the first set and a second sub-channel to the second set (the available power ratios are divided into at least one known region and each applied power ratio belongs to one region), estimates bit error probability for each of the bursts of the received data; and applies an adaptation process in order to make the estimated bit error probabilities fall into one of bit error probability intervals of a predefined mapping table with a predetermined probability. which determines the bit error probability that is to be reported to a network.

23 Claims, 4 Drawing Sheets

| MAPPING TABLE | |
|---|---|
| AVERAGE BEP | INTERVAL |
| #1 | [a...b] |
| #2 | [b...c] |
| ⋮ | ⋮ |
| #32 | [y...z] |

600

U.S. PATENT DOCUMENTS

| | | | |
|---|---|---|---|
| 2010/0302990 A1* | 12/2010 | Lopez et al. | 370/312 |
| 2010/0322092 A1* | 12/2010 | Yu | 370/252 |
| 2011/0051650 A1* | 3/2011 | Winstok et al. | 370/312 |
| 2011/0082689 A1 | 4/2011 | Juncker et al. | 704/201 |
| 2011/0122851 A1* | 5/2011 | Gessner et al. | 370/336 |
| 2011/0122852 A1* | 5/2011 | Yu et al. | 370/337 |
| 2011/0149778 A1* | 6/2011 | Yu | 370/252 |
| 2011/0170482 A1* | 7/2011 | Dhanda | 370/328 |
| 2011/0310762 A1* | 12/2011 | Choi et al. | 370/252 |
| 2012/0113878 A1* | 5/2012 | Yu et al. | 370/311 |

FOREIGN PATENT DOCUMENTS

| | | |
|---|---|---|
| EP | 1 921 772 A2 | 5/2008 |
| GP | 2 387 277 A1 | 11/2011 |
| WO | WO 2010/088793 A1 | 8/2010 |

OTHER PUBLICATIONS

3GPP TSG GERAN #41, St. Julians, Malta, $16^{th}$-$20^{th}$ Feb. 2009, Huawei Technologies Co., Ltd., GP-090087, "Discussions on SCPIR Selection for Alpha-QPSK", (4 pages).

* cited by examiner

MOBILE COMMUNICATIONS NETWORK

CROSS REFERENCE TO RELATED APPLICATION

This application is a continuation of U.S. patent application Ser. No. 13/108,352, filed on May 16, 2011; and this application further claims benefit under 35 U.S.C. §119(a) and 37 CFR 1.55 to UK Patent Application GB1108159.3, filed on May 16, 2011.

FIELD OF THE INVENTION

The invention relates generally to mobile communications networks. More particularly, but not exclusively, the invention relates to reporting bit error probability (BEP) values in, for example, a cellular Global System for Mobile communications (GSM) network.

BACKGROUND OF THE INVENTION

In radio communications networks, such as a GSM network, the network may comprise t base stations (BTS) communicating with user terminals (UT). It is important to optimize the capacity of the network. However, doing so may affect other important aspects of the network operation such as link quality of communications between the BTS and the UTs, which is reflected by the accuracy of BEP measurements and reports. Therefore, there is a need to develop ways to allow an increase of the capacity without sacrificing the reliability of the communications.

SUMMARY OF THE INVENTION

According to a first aspect of the present invention, there is provided a method for applying an adaptation process in data communication utilizing a time-division multiplexing communication protocol, the method comprising: receiving data in a first user terminal during a time slot assigned for simultaneous transmission of data to a first set of at least one user terminal and to a second set of at least one user terminal in the time-division multiplexing communication protocol; estimating the applied power ratio between the transmission power of a first sub-channel to the first set and the transmission power of a second sub-channel to the second set, wherein the available power ratios are divided into at least one known region and each applied power ratio belongs to one region; estimating a bit error probability for each of the bursts of the received data; and applying an adaptation process in order to make the estimated bit error probabilities to fall into one of bit error probability intervals of a predefined mapping table with a predetermined probability, wherein the bit error probability interval in which the estimated bit error probabilities fall determines the bit error probability that is to be reported to a network and the adaptation process to be applied depends on which region the applied power ratio belongs to.

According to a second aspect of the present invention, there is provided a method for generating adaptation data for performing an adaptation process, the method comprising: dividing the range of available power ratios between the transmission power of a first sub-channel to a first set of at least one user terminal and the transmission power of a second sub-channel to a second set of at least one user terminal into at least one region; and associating each region with specific adaptation data that is to be applied in the adaptation process when receiving data in a time slot assigned for simultaneous transmission of data to the first set and to the second set in a time-division multiplexing communication protocol.

According to a third aspect of the invention, there is provided an apparatus comprising means for receiving data in a first user terminal during a time slot assigned for simultaneous transmission of data to a first set of at least one user terminal and to a second set of at least one user terminal in the time-division multiplexing communication protocol; means for estimating the applied power ratio between the transmission power of a first sub-channel to the first set and the transmission power of a second sub-channel to the second set, wherein the available power ratios are divided into at least one known region and each applied power ratio belongs to one region; means for estimating a bit error probability for each of the bursts of the received data; and means for applying an adaptation process in order to make the estimated bit error probabilities to fall into one of bit error probability intervals of a predefined mapping table with a predetermined probability, wherein the bit error probability interval in which the estimated bit error probabilities fall determines the bit error probability that is to be reported to a network and the adaptation process to be applied depends on which region the applied power ratio belongs to.

According to a fourth aspect of the invention, there is provided an apparatus comprising means for dividing the range of available power ratios between the transmission power of a first sub-channel to a first set of at least one user terminal and the transmission power of a second sub-channel to a second set of at least one user terminal into at least one region; and means for associating each region with specific adaptation data that is to be applied in an adaptation process when receiving data in a time slot assigned for simultaneous transmission of data to the first set and to the second set in the time-division multiplexing communication protocol. In an embodiment, the apparatus comprises means for applying a power ratio linkable to a certain region in transmission of data to the first and to the second set; means for obtaining information on bit error rate probabilities estimated in the user terminal associated with the transmission; means for determining actual bit error probabilities corresponding to the estimated bit error probabilities; means for generating adaptation data for the region which is linkable to the applied power ratio, wherein the adaptation data is generated on the basis of a comparison between the estimated bit error probabilities and the actual bit error probabilities; and means for performing the generation of the adaptation data for each of the at least one region thereby associating each region with a region-specific adaptation data. In an embodiment, the apparatus comprises means for dividing the range of available power ratios into at least two regions.

According to a fifth aspect of the invention, there is provided a computer program product embodied on a distribution medium readable by a computer and comprising program instructions which, when loaded into an apparatus, execute the method of the invention.

Other aspects and embodiments of the invention will become apparent from the following description and claims.

BRIEF DESCRIPTION OF THE DRAWINGS

In the following, the invention will be described in greater detail with reference to the embodiments and the accompanying drawings, in which.

DETAILED DESCRIPTION OF EMBODIMENTS OF THE INVENTION

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as GSM networks, comprise base stations (BTS) that communicate with one or more user equipment (UE) terminals (or, simply, "UE"). A UE may also be referred to as a user terminal, a terminal device, a terminal apparatus, a terminal or a mobile station, for example. Although the description uses a UE or a terminal as examples when describing the embodiments, the embodiments may as well be performed by any apparatus such as a chip, a chipset, a module, an ASIC, etc., and the apparatus may be a module (to be attached to the UE) providing connectivity, such as a plug-in unit, a "USB dongle", or any other kind of unit. A unit may be installed either inside UE or attached to UE with a connector or even wirelessly. GSM systems may also comprise optional network elements that provide an interconnection with a core network. A BTS connects UEs via the so-called radio interface to the network. The BTS may provide radio coverage to a cell, control radio resource allocation, perform data and control signaling, etc. The BTS may be a base station controller (BSC) as in the GSM, or any other apparatus capable of controlling radio communication and managing radio resources within a cell. The cell may be a macrocell, a microcell, or any other type of cell where radio coverage is present.

A GSM network uses time division multiplexing (TDM) and time division multiple access (TDMA) techniques for communicating with UEs. This means that each UE is allocated a specific interval of time during which the UE may communicate with the BTS. In addition, a GSM network combines TDMA with frequency hopping and wideband transmission to minimize common types of interference. In a GSM system, synchronization of a UE is achieved by sending timing advance commands from the BTS to the UE, such that the UE is informed when to transmit, i.e. timing advance commands indicate a specific time slot which is to be used by the UE. For modulation of the data, GSM applies Gaussian minimum shift keying (GMSK). Although the present description uses a GSM network as the exemplary network, the embodiments are applicable to any kind of network operating under a TDM protocol where users are allocated certain time slots for communication.

Figure 1:
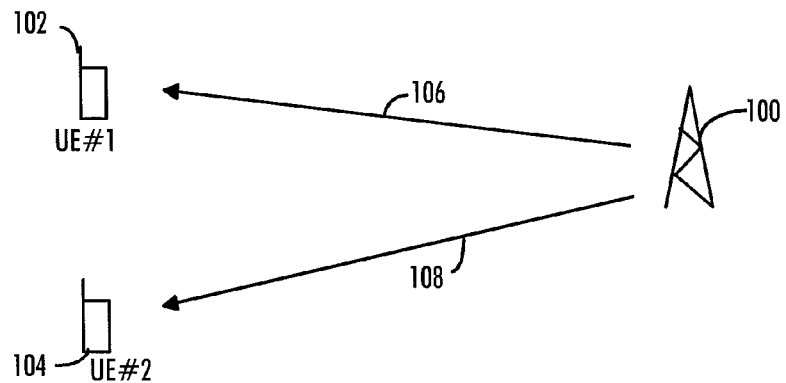
FIG. 1 is a diagram that illustrates a communication between a base station and two user terminals.

According to current developments, a feature referred to as voice services over adaptive multi-user orthogonal sub-channels (VAMOS) is provided for network protocols applying TDM/TDMA. VAMOS allows two full rate GMSK users, four half rate GMSK users, or one full rate and two half rate GMSK users, to be multiplexed onto a single timeslot by transmitting two GMSK signals from a BTS as one quadrature phase shift keying (QPSK) signal (where QPSK refers to PSK with four states). In other words, the user terminals applying VAMOS may be grouped into two sets, each having at least one user terminal. For example, each set may comprise either one full rate or 2 half rate users. VAMOS is illustrated in FIG. 1, where a BTS 100 transmits data (such as speech data, but can be other data as well), to UE#1 102 and UE#2 104 via respective communication links 106 and 108. Thus, this example assumes two full-rate users. VAMOS therefore introduces a formal framework on how two traditional GMSK speech signals (also referred to as 'sub-channels' in the following) are to be served by the same timeslot by transmitting a QPSK modulation carrying twice the number of bits per symbol. In other words, the transmission shown in FIG. 1 takes place by using the same time slot in a TDM protocol. VAMOS is an interesting feature since the speech capacity of a GSM network may be more or less doubled when compared to existing GSM networks (or similar) using GMSK for speech data.

A terminal supporting VAMOS may also need to support a new set of GSM training sequence codes and may be based on either DARP (downlink advanced receiver performance) phase I or on more advanced receiver architectures. Hence performance requirements are being specified for two levels of VAMOS-aware terminals i.e. VAMOS level I terminals are expected to be based on the DARP phase I receiver architecture and VAMOS level II terminals are expected to be based on more advanced receiver techniques fulfilling some tightened performance requirements. The requirement to specify both types of terminal is driven by the desire of the mobile vendors to get VAMOS support into terminals at an early point in time; since VAMOS level I terminals may be ready earlier than VAMOS level II terminals. Thereafter, the network capacity gain may be obtained by either pairing a VAMOS capable terminal with a legacy terminal or by pairing a VAMOS capable terminal with another VAMOS capable terminal.

Figure 2A:
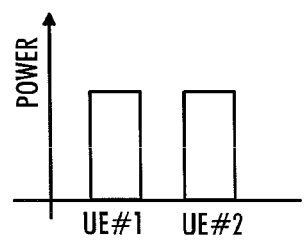
FIGS. 2A and 2B are graphs showing exemplary power ratios applied in data communications.
Figure 2B:
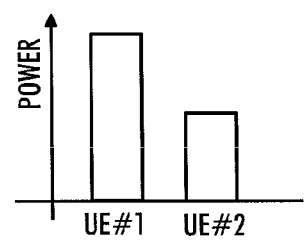

However the multiplexing of two sub-channels onto a single timeslot can introduce co-channel interference between the two sub-channels that share the same timeslot in the signal transmitted from the BTS. The ratio of the co-channel interference between the two sub-channels typically depends on the applied power ratio between the transmission powers of a first and a second sub-channel assigned to a first set of at least one user terminal and to the second set of at least one user terminal, respectively. The ratio is called a sub-channel power imbalance ratio (SCPIR) which therefore impacts the UE performance of each of the terminals assigned to the two subchannels. The SCPIR value, which may also simply be referred to hereinafter as a 'power ratio', is used by the BTS to control how the transmission power is split between the two paired sub-channels, and is defined by SCPIR=P1/P2 where P1 and P2 are the transmission powers of the sub-channel 1 (aimed for the UE #1 of FIG. 1, for example) and sub-channel 2 (aimed for the UE #2 of FIG. 1, for example), respectively. Alternatively, or in addition, the SCPIR may also be measured in terms of an angle for the constellation points called alpha ($\alpha$), that is SCPIR=$10 \log_{10}(\alpha^2/(2-\alpha^2))$. As a result, adjusting the SCPIR allows the BTS to control the allocation of power between the two paired sub-channels. This is illustrated in FIGS. 2A and 2B. When SCPIR=1 is used, the two sub-channels have the same power allocated as shown in FIG. 2A and thus the power of an interfering sub-channel will have the same power as a desired sub-channel regardless of the sub-channel a given terminal is supposed to detect. However, it may be desirable to have SCPIR≠1 in order to allocate more power to one of the two sub-channels, i.e. allocate different power levels for the underlying paired users as shown in FIG. 2B, where more power is allocated for UE#1 than for UE#2. As SCPIR≠1 results in one sub-channel having more power than the other, it also changes the ratio of desired power to interfering power as seen from both sub-channel's point of view. In this case, the sub-channel having the smallest power allocation (i.e. UE#2 in FIG. 2B) may experience a higher level of interference.

Figures 6, 7, 8, 9:
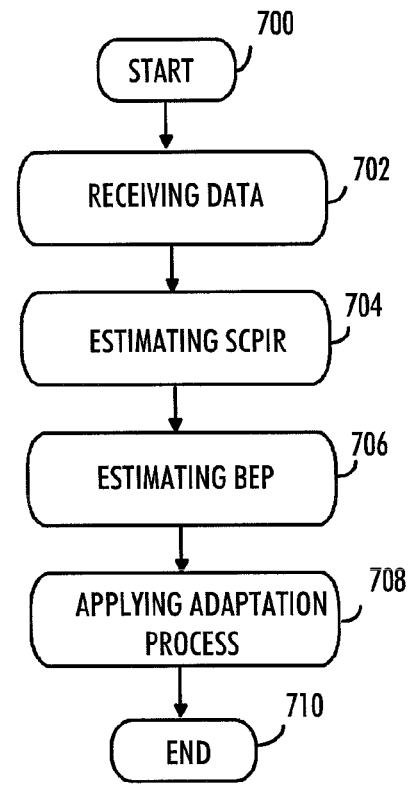
FIG. 6 is an exemplary predefined mapping table.
FIG. 7 is a flow diagram illustrating an exemplary method of applying an adaptation process.
FIG. 8 is an exemplary scaling table.
FIG. 9 is an exemplary scaled mapping table.

UEs, such as the UE#1 102 and UA#2 104 in FIG. 1, may be required to report to the network BEP values measured by the UE, the BEP indicating the quality of a link between the UE and BTS. The GSM specification may prescribe certain criteria to the reporting, such as the accuracy of the reported BEP. The UE may report the BEP by mapping estimated BEP values per burst (i.e. per time slot) into one of 32 intervals as is currently specified by a technical specification group GSM/EDGE radio access network of the 3$^{rd}$ generation partnership project (3GPP) in TS 45.008, version 9.6.0. This is shown in FIG. 6, where a mapping table 600 is shown. The mapping table contains the said 32 states and the UE performs the BEP reporting by transmitting the BEP according to one of the 32 states. The selection on which BEP state to apply is made based on the estimated BEP values. The BEP estimates are allowed to fall within a predefined interval with a certain probability. For example, in FIG. 6, the BEP according to state #1 is reported if the estimated BEP values fall within the required probability within range [a . . . b], the BEP according to state #2 is reported if the estimated BEP values fall within the required probability within range [b . . . c], etc. As can be seen, the mapping table may include some overlap in the BEP intervals, although this is not necessary. For example, given a transmission in a certain BEP state (one of the 32 possibilities), 80% of the estimates reported back from the UE should be within that correct region (i.e. the UE should report the correct state or the reported BEP estimates should be within the interval of the correct state e.g. [a . . . b] 80% of the time). The minimum probability for the BEP estimates to fall within the interval are specified both for speech data (for the GMSK and for different codecs, such as for TCH, E-TCH and O-TCH) and for a general packet radio service (GPRS) applying either GMSK or 8PSK.

Figure 3:
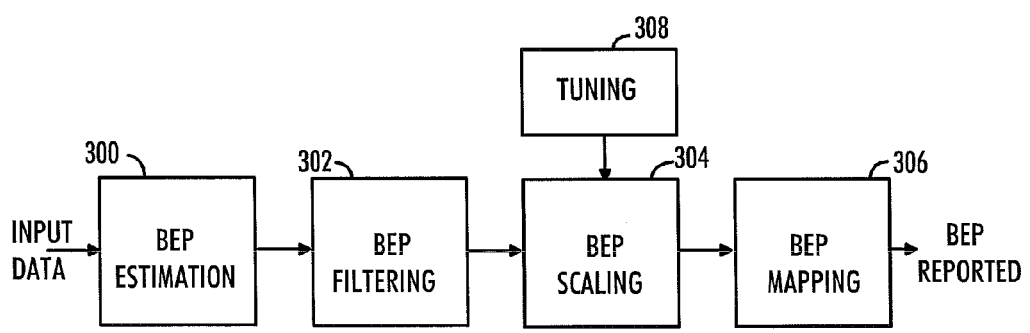
FIG. 3 is a flow diagram showing a process of correcting BEP values.

In order to meet these BEP reporting requirements the UE may require some form of correction between the estimated BEP and the actual BEP so as to satisfactorily map the estimated BEP values into the required interval as specified by the specifications. In other words, there may be situations when the estimated BEP values do not fall within any of the BEP intervals of FIG. 6 with required probability. Therefore, a correction (scaling) may be required. FIG. 3 shows an exemplary method applied by the UE in correcting the estimated BEP values in order to make the BEP estimates fall into predetermined BEP intervals. In block 300, the BEP is estimated. The BEP estimates may be obtained for each channel on a burst-by-burst (i.e. timeslot by timeslot) basis by the UE. The input for the block 300 may be, for example, the soft bits from a MAP equalizer of the receiver. One possible way to determine the estimation of BEP is according to the equation which reads as:

$$BEP_{est} = \frac{1}{N} * \sum_{i=1}^{N} \frac{1}{1+e^{|S_i|}},$$

where $BEP_{est}$ is the estimated BEP for a burst, Si is the i$^{th}$ softbit from the MAP equalizer, and N is number of softbits in a burst, such as 116. Alternatively any estimation method as required by the vendor may be applied. The estimated BEP is then filtered (averaged) in block 302 over the BEP reporting period, such as over 104 frames corresponding to 480 ms as in the GSM. However, the type of filtering is specified by the 3GPP and may differ between EGPRS and speech services. In block 304, an adaptation process is applied to scale the BEP estimates to appropriate values which fall into one of BEP intervals of a known mapping table 600 of FIG. 6. The mapping table may be specified by the standards, for example. Finally, in block 306, the estimated BEP values may be mapped to one of the 32 reporting values according to the 3GPP specification as a result of successful scaling. Therefore, the BEP which characterizes the link quality is obtained and may be reported to the network. It should also be noted that the scaling and mapping could be combined into one step, or the scaling could be done as part of the estimation as well, i.e. prior to the BEP filtering. The adaptation process and information needed therein may be obtained through a tuning phase, which may be conducted offline in testing environment (block 308). The UE may be hardcoded with the obtained adaptation data and use the adaptation data during actual communication between the BTS and the UE. The tuning phase will be explained later in more detail.

However, when VAMOS is applied (i.e. transmission of for example speech data to two terminals takes place within the same time slot in TDM communication), the applied SCPIR will also impact the BEP measurement performed by the terminals, since a different SCPIR value means different interference level seen from both sub-channel's point of view. The SCPIR impact on the required BEP measurement is expected to differ for VAMOS level I terminals and VAMOS level II terminals, since these are expected to use different hardware architectures. Nevertheless, the terminal reporting the BEP is required to meet predefined BEP requirements no matter which SCPIR the network has used for its VAMOS transmission. This may cause problems in meeting the specified requirements with respect to being able to map the BEP estimates into one of the BEP intervals of the predefined mapping table when selecting the BEP to be reported to the network from a VAMOS capable terminal. In other words, when the SCPIR is changed causing a different level of interference, the accuracy of the BEP measurement will deteriorate to such an extent that the terminal may no longer be capable of meeting the 3GPP specification requirements for the reported BEP measurement accuracy.

Figure 5:
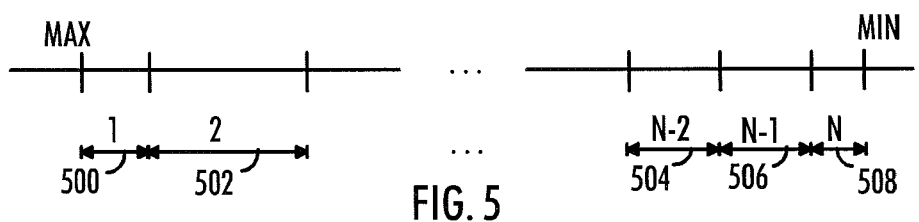
FIG. 5 is a diagram representing a division of available power ratio range according to an embodiment.

For this reason it is proposed to divide the range of available power ratios between the transmission power of a first sub-channel to a first set of at least one user terminal and the transmission power of a second sub-channel to a second set of at least one user terminal (i.e. SCPIR) into at least one region (i.e. power ratio region) and to associate each region with a region-specific adaptation data that is to be applied in an adaptation process when receiving data in a time slot assigned for simultaneous transmission of data to the first set and to the second set in the time-division multiplexing communication protocol. The data that is transmitted and received may comprise at least one of the following types of data: speech, text, video, multimedia, user data, control data, etc. In general the data can be any type of data that may be communicated between the BTS and the UE. The adaptation process may be performed by/in the UE#1 102 and/or UE#2 104 of FIG. 1, for example. The division of the range of power ratios is shown in FIG. 5. According to the proposed solution as shown in FIG. 5, the SCPIR ranges are split into N regions 500 to 508. The range of available powers ratios may vary depending on which type of user terminal is in question. For example, for a VAMOS level I terminal, the range of power ratios available (i.e. the SCPIR operating range available) may comprise values between −4 dB to +4 dB. For a VAMOS level II terminal, the SCPIR operating range available may comprise values between −10 dB to +10 dB. The number of regions N may be anywhere between one and an infinite number of regions. When dividing into one region, the whole range available is within the single region. In an embodiment, the number of regions may be anything between two and an infinite number of regions, i.e. the range of available power ratios is divided into at least two regions. This embodiment allows a more accurate BEP reporting capability as the number of regions, each of which is given a specific adaptation data, is higher. The exact number N can be chosen according to complexity and performance requirements. When at least two regions are used, the regions need not be uniform in size, but they can be. For example, from FIG. 5 it can be seen that region 502 spans more SCPIR values than the region 500. Applying non-uniform sizes, i.e. at least one region spans a different amount of the SCPIR range than the others, enables more flexibility in selection of the SCPIR values within a specific region. This may be of use when the estimated BEP values corresponding to a certain range of SCPIRs are substantially unchanged but even a small change of SCPIR in another part of the available SCPIR operation range affects the estimated BEP values significantly. For example, if it is observed that power ratios from −10 dB to −5 dB result in the estimated BEP values being substantially the same (or only small variation), then one region may hold SCPIR values from −10 dB to −5 dB. This is because a same scaling may be performed for each of these SCPIR values. However, if it is observed that power ratios from, for example, 0 dB to 3 dB result in the estimated BEP values being very different, then one region may hold SCPIR values between 0 dB and 1 dB and another power ration region may hold SCPIR values between 2 dB and 3 dB.

As the available SCPIR operation range is divided into at least one region, it is proposed to carry out an appropriate tuning for each of the at least one region, thereby producing a different adaptation data for each of the at least one region. Thus, each region may be associated with a region-specific adaptation data that can be used in the actual communication between the BTS and the UE when the UE performs the adaptation process. The tuning phase is depicted in more detail in FIG. 4. As indicated earlier, the tuning phase may be conducted offline beforehand and the obtained adaptation data may be preconfigured in the UEs. The tuning phase may start in block 400 by dividing a range of available power ratios between the transmission powers for the first set and for the second set of at least one user terminal into at least one region. The at least one region may thus correspond to the N regions of FIG. 5, for example. In case only one region is applied, the single region comprises all the available SCPIR values. The available range may be, for example, from −10 dB to +10 dB as is the case for a VAMOS level II terminal. That is, it may be known beforehand.

In block 402, a certain power ratio (i.e. SCPIR) linkable to a certain region is applied in a transmission of data to the first and to the second set. Linkable here denotes that the applied power ratio need not necessarily fall within the certain range but the applied power ratio may be outside the current linkable region. For example, the applied SCPIR value may fall within the current region, outside the region, or locate at the boundary of two adjacent regions. In an embodiment, the applied power ratio does not belong to the certain region in question. However, if the used power ratio value locates outside the certain power ratio region, it may still be linkable to the certain region so that the tuning phase for the certain region may be performed. For example, the applied SCPIR may locate in the close vicinity of the certain power ratio region. The use of a power ratio outside the current power ratio region may be advantageous and even required due to saturations in the receivers and fixed point issues.

In block 404, information on bit error rate probabilities estimated in the user terminal associated with the transmission is obtained. The manner of estimating the BEP values is given with respect to FIG. 3. The estimated BEP values may be obtained by, for example, receiving the estimated BEP values from the user terminal or by estimating the BEP values.

Then, in block 406, actual BEP values corresponding to the estimated BEP values are determined or measured. This can be known by comparing the actually transmitted bits and the received bits. This way it is known what the BEP should be.

In block 408, generating adaptation data for the region which is linkable to the applied power ratio is performed. The adaptation data is generated on the basis of a comparison between the estimated BEP values and the actual BEP values. The obtaining of the adaptation data may comprise, for example, plotting the estimated BEP values against their corresponding actual BEP values and deriving scaling values needed to make the actual and the estimated BEP values match. Therefore, this may require knowledge of the actual BEP and assessment of the BEP estimate reports based on the same period of time. By knowing the actual BEP interval at which the transmission took place at a known transmit power, it is possible to obtain adaptation data for the corresponding region which can be used, for example, to scale the BEP estimates to match the actual BEP values. When this adaptation data is applied during actual communication between the BTS and the UE, the UE may make its estimated BEP values, which may not at first match the actual BEP values due to varying SCPIR value, match the actual BEP and thereby fall into one of the BEP regions defined in the specification.

In step 410 it is checked whether all regions have been associated with region-specific adaptation data. If the answer is positive, then the tuning may be finished at block 414. However, if the answer is negative, then another SCPIR value (i.e. another transmit power) is selected in block 412, wherein the newly selected SCPIR value is linkable to another region. Consequently, the tuning process is re-started from block 402, this time applying the newly selected power ratio. This way the generation of the adaptation data is performed for each of the at least one region, thereby associating each region with specific adaptation data. In case of only one region, the tuning may be performed by using one SCPIR value to optimize the BEP reporting over all other SCPIR values in the single region.

Figure 4:
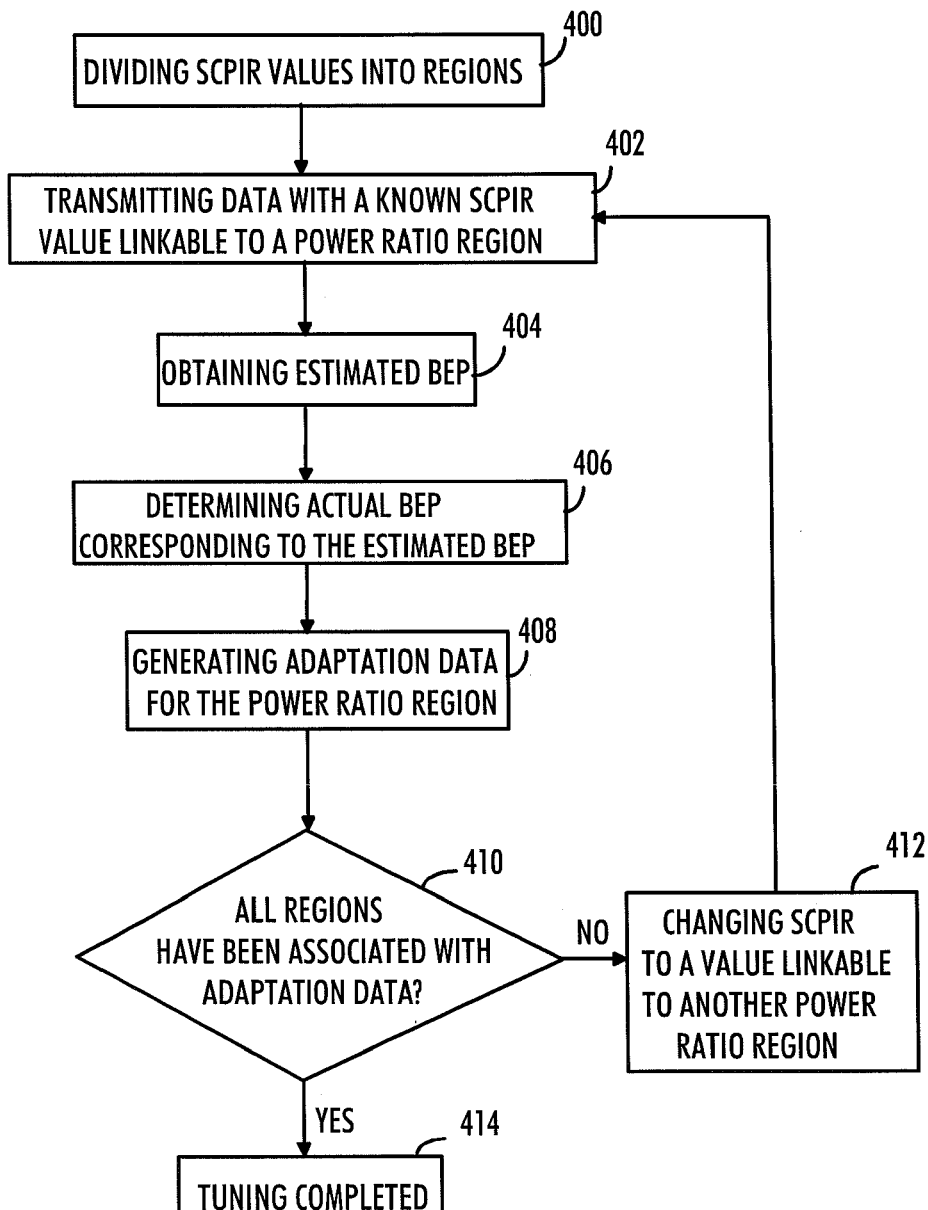
FIG. 4 is a flow diagram illustrating an exemplary tuning phase.

The tuning may be done once for a given platform or chipset as the BEP is measured in the receiver and is influenced for example by the noise present in the system and the actual RF components used. However, the tuning may be redone at a later stage in order to update or modify the adaptation data, if needed. The tuning may be carried out for each region using VAMOS signals at a certain SCPIR, as shown in FIG. 4. Having a set of tuning phases for the different regions gives a level of flexibility for VAMOS signals that may be required to meet the specification requirements relating to the BEP estimation accuracy of having the BEP estimates fall within one of the predefined BEP intervals. In other words, once tuned, the UE may then be able to perform the adaptation process with the adaptation data and, for example, appropriately scale the estimated BEP to fall into the required intervals in the specification.

FIG. 7 shows a method applied in the actual data communication utilizing the time-division multiplexing communication protocol between the BTS and the UE. The method starts in step 700. An apparatus, such as the UE#1 102 in FIG. 1 (or a chip, a chipset, a processor, a micro controller, a combination of such circuitries, a module interoperating with the UE, a plug-in unit, a "USB dongle", etc.) may, in step 702, receive data during a time slot assigned for simultaneous transmission of data to the first set of at least one user terminal and to the second set of at least one user terminal. In an embodiment the first set of at least one user terminal and the second set of at least one user terminal receive speech data in a GSM network and apply VAMOS. Then, in step 704, the UE may estimate the applied power ratio between transmission powers of a first and a second sub-channel to the first and to the second set, respectively, wherein the available power ratios are divided into at least one known region and each applied power ratio belongs to one region, as explained earlier with respect to FIG. 5. The estimation of the SCPIR is vendor specific. The UE may, for example, apply a well-known Newton method for the estimation, but other known methods are also available. Alternatively, the estimation may be conducted by measuring a related parameter alpha. The measured alpha may indicate the used power ratio to the UE as the alpha is directly related to the applied power ratio. In step 706, the UE may estimate the BEP for each of the bursts of the received data. This may be made as explained with respect to FIG. 3. In step 708, the UE may apply the adaptation process in order to make the estimated BEP values to fall into one of BEP intervals of a predefined mapping table with a predetermined probability, wherein the BEP interval in which the estimated BEP values fall determines the BEP that is to be reported to a network, wherein the adaptation process to be applied depends on which region the applied power ratio belongs to. As the UE is aware of the estimate of the SCPIR (i.e. the power ratio applied), it may select an adaptation process that corresponds to the applied power ratio. As explained earlier, the region-specific adaptation processes and information required therein may be obtained offline in the tuning phase, for example, and be hardcoded to the UE. The method ends in step 710.

The adaptation data to be used in the adaptation process may comprise at least one of the following: scaling values for scaling the estimated BEP values, a scaling table for obtaining the scaled estimates of BEP values, and a scaled mapping table having BEP intervals into which the estimated BEP values directly fall with a predetermined probability. In the following these are explained in more detail.

In an embodiment, the adaptation process comprises scaling the estimated BEP values to match corresponding actual BEP values in order to make the scaled estimated BEP values directly fall into one of BEP intervals of the predefined mapping table, wherein the scaling is based on known region-specific scaling values or scaling tables. An example of the scaling table 800 is shown in FIG. 8, wherein it can be seen that, for example, when the estimated BEP value is A, the scaled estimated value is A' which corresponds to the actual BEP. Thus, the scaling table is used to directly give a scaled value of the estimated BEP that is to be used when detecting whether the estimated BEP values fall into one of the BEP intervals of the predefined mapping table with certain predefined probability. Scaling values on the other hand indicate the correction that is needed to be performed to the estimated BEP values in order to reach the scaled (corrected) BEP values which can be mapped to the predefined mapping table. The region-specific scaling values and/or the scaling table may be obtained by comparing the estimated BEP values and the actual BEP values in the tuning phase, as explained earlier. The predefined mapping table may here be the mapping table 600 of FIG. 6 as given from the network. As a result, the UE is able to select the conesponding BEP to be reported to the network from the predefined mapping table.

In an embodiment the adaptation process comprises applying a known region-specific scaled mapping table as the predefined mapping table, wherein the scaled mapping table has BEP intervals scaled with respect to the BEP intervals of the original predefined mapping table in order for the estimated BEP values to fall directly into one of the BEP intervals of the scaled mapping table. Thus, the predefined mapping table is in this embodiment a scaled mapping table instead of the mapping table given by the network. However, there is correspondence between the two tables as the scaled one is scaled with respect to the original mapping table, such as the predefined mapping table of FIG. 6. An example of a scaled mapping table 900 for a certain region is shown in FIG. 9. When comparing this to the mapping table of FIG. 6, it can be seen that the BEP interval values have been scaled (a->a', b->b', etc.) to correspond better to the estimated BEP values. This way the estimated BEP values without any further scaling may directly fall into one of the BEP intervals of the scaled mapping table. This embodiment has the advantage that no scaling of the estimated BEP values is needed and computational resources may be saved at the UE. So instead of scaling the estimated BEP values and then mapping them into the 32 regions, it is possible to find the scaling values and scale the mapping table itself. When in operation then the actual estimated BEP value is mapped into the new scaled table. Again, the scaled mapping tables for some or all of the at least one region may be hardcoded in the UE as a result of the tuning phase. Consequently, the UE is able to select the corresponding BEP to be reported to the network from the predefined mapping table.

Figure 10:
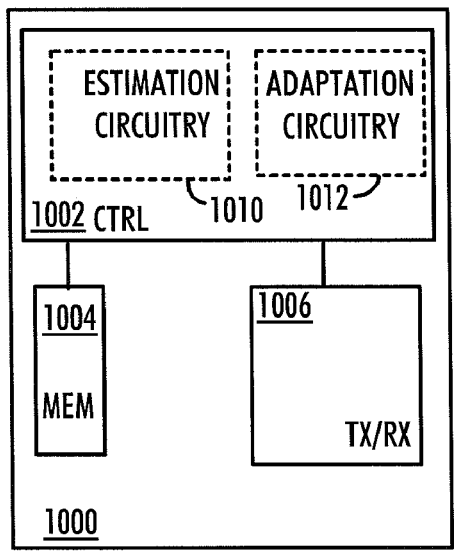
FIGS. 10 and 11 are block diagrams illustrating exemplary apparatuses according to embodiments of the present invention.

An embodiment, as shown in FIG. 10, provides an apparatus 1000, such as a user terminal, comprising at least one processor 1002 and at least one memory 1004 including a computer program code, wherein the at least one memory 1004 and the computer program code are configured, with the at least one processor 1002, to cause the apparatus 1000 to carry out any of the above-described processes performed by a user terminal. It should be noted that FIG. 10 shows only the elements and functional entities required for understanding the apparatus 1000. Other components have been omitted for reasons of simplicity. The implementation of the elements and functional entities may vary from that shown in FIG. 10. The connections shown in FIG. 10 are logical connections, and the actual physical connections may be different. The connections can be direct or indirect and there can merely be a functional relationship between components. It is apparent to a person skilled in the art that the apparatus may also comprise other functions and structures.

As described, the apparatus 1000 may comprise the terminal device of a cellular communication system, e.g. a computer (PC), a laptop, a tablet computer, a cellular phone, a communicator, a smart phone, a palm computer, or any other communication apparatus. In another embodiment, the apparatus is comprised in such a terminal device, e.g. the apparatus may be or comprise a circuitry, e.g. a chip, a chipset, a processor, a micro controller, or a combination of such circuitries in the terminal device and cause the terminal device to carry out the above-described functionalities. Further, the apparatus 1000 may be (or may comprise) a module (to be attached to the UE) providing connectivity, such as a plug-in unit, an "USB dongle", or any other kind of unit. The unit may be installed either inside the UE or attached to the UE with a connector or even wirelessly.

As said, the apparatus 1000 may comprise the at least one processor 1002. The at least one processor 1002 may be implemented with a separate digital signal processor provided with suitable software embedded on a computer readable medium, or with a separate logic circuit, such as an application specific integrated circuit (AS-IC). The at least one processor 1002 may comprise an interface, such as computer port, for providing communication capabilities. The at least one processor 1002 may comprise an estimation circuitry 1010. The estimation circuitry 1010 may be applied in estimating the applied SCPIR and estimating the BEP values, for example. The at least one processor 1002 may also comprise an adaptation circuitry 1012 for performing the adaptation process in order to make the estimated BEP values to fall into one of BEP intervals of a predefined mapping table with a predetermined probability.

The apparatus 1000 may further comprise radio interface components 1006 providing the apparatus with radio communication capabilities with the radio access network. The radio interface components 1006 may comprise standard well-known components such as amplifier, filter, frequency-converter, (de)modulator, and encoder/decoder circuitries and one or more antennas. The radio interface components may be used in reporting the BEP to the network, for example. The apparatus 1000 may also be equipped with radio functionalities required for operating in the VAMOS mode.

As described, the apparatus 1000 may comprise a memory 1004 connected to the processor 1002. However, memory may also be integrated to the processor 1002 and, thus, no memory 1004 may be required. The memory 1004 may be for storing adaptation data for each region, information regarding the division of the SCPIR values into at least one region, etc.

Figure 11:
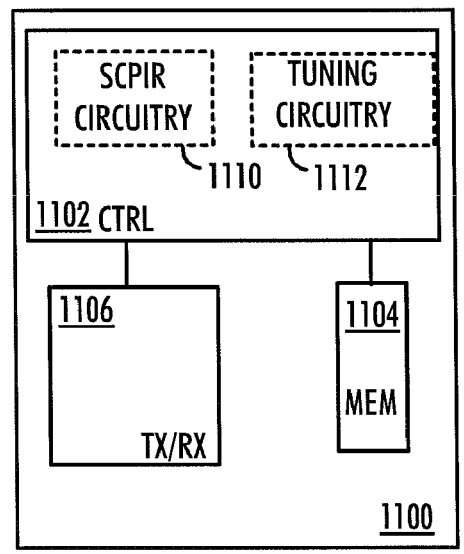

An embodiment, as shown in FIG. 11, provides an apparatus 1100, such as a network element (e.g. a BTS), comprising at least one processor 1102 and at least one memory 1104 including a computer program code, wherein the at least one memory 1104 and the computer program code are configured, with the at least one processor 1102, to cause the apparatus 1100 to carry out any of the above-described processes performed by a network element. It should be noted that FIG. 11 shows only the elements and functional entities required for understanding the apparatus 1100. Other components have been omitted for reasons of simplicity. The implementation of the elements and functional entities may vary from that shown in FIG. 11. The connections shown in FIG. 11 are logical connections, and the actual physical connections may be different. The connections can be direct or indirect and there can merely be a functional relationship between components. It is apparent to a person skilled in the art that the apparatus may also comprise other functions and structures.

The apparatus 1100 may be comprised in a base station (also called a base transceiver station). The apparatus 1100 may comprise a circuitry, e.g. a chip, a processor, a micro controller, or a combination of such circuitries in the base station and cause the base station to carry out the above-described functionalities.

As described, the apparatus 1100 may comprise the at least one processor 1102. The at least one processor 1102 may be implemented with a separate digital signal processor provided with suitable software embedded on a computer readable medium, or with a separate logic circuit, such as an application specific integrated circuit (ASIC). The at least one processor 1102 may comprise an interface, such as computer port, for providing communication capabilities. The at least one processor 1102 may comprise a SCPIR circuitry 1110. The SCPIR circuitry 1110 may be responsible of dividing the available SCPIR range into at least one region. The SCPIR circuitry may also adapt the performed division later, thus change the current division of SCPIR values in terms of the number of regions and the amount of SCPIR values within a specific region. The SCPIR circuitry 1110 may also be responsible of determined the applied SCPIR value in the data communication to two user terminals. The at least one processor 1102 may also comprise a tuning circuitry 1112 for performing the tuning phase as described above. Thus, the tuning circuitry 1112 may be responsible of determining the actual BEP, comparison of actual BEP against the estimated BEP and associating each region with adaptation data that the UE may apply in the adaptation process.

The apparatus 1100 may further comprise radio interface components 1106 providing the apparatus with radio communication capabilities with the radio access network. The radio interface components 1106 may comprise standard well-known components such as amplifier, filter, frequency-converter, (de)modulator, and encoder/decoder circuitries and one or more antennas. The apparatus 1100 may also be equipped with radio functionalities required for operating in the VAMOS mode, thus it may comprise, for example, a QPSK modulator for transmitting the data to user terminals.

As described, the apparatus 1100 may comprise a memory 1104 connected to the processor 1102. However, memory may also be integrated to the processor 1102 and, thus, no memory 1104 may be required. The memory 1104 may be for storing adaptation data for each region, information regarding the division of the SCPIR values into at least one region, etc.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The embodiments of the invention offer many advantages. They allow flexibility to the tuning phase by allowing easy updates when different platforms (RF, chipset, antenna) are used which causes changes to noise levels and, hence, the BEP estimates. The embodiments facilitate large variations, originating from differences in RF IC design, to be tuned to meet the same set of 3GPP BEP measurement requirement. Further the embodiments allow the receiver (UE) to meet the BEP requirements without requesting a severe relaxation of the current BEP requirements laid down in the standard 3GPP specification.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises means configure to carry out functions associated with any of the FIGS. 1 to 11. In an embodiment, the at least one processor, the memory, and the computer program code form means for carrying out the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A data communications method for a time-division multiplexed communications protocol in which data intended for plural user terminals can be simultaneously transmitted in one time slot, the method comprising:

receiving data in a first user terminal during a time slot assigned for simultaneous transmission of data to a first set of at least one user terminal and to a second set of at least one user terminal;

estimating an applied power ratio between the transmission power of a first sub-channel to the first set and the transmission power of a second sub-channel to the second set, wherein available power ratios are divided into at least one known region and each applied power ratio belongs to one region;

estimating a bit error probability for each burst of the received data; and applying an adaptation process in order to make the estimated bit error probabilities fall into one bit error probability interval of a predefined mapping table with a predetermined probability, wherein the bit error probability interval in which the estimated bit error probabilities fall determines the bit error probability that is to be reported to a network, and the adaptation process to be applied depends on which region the applied power ratio belongs to.

2. The method of claim 1, wherein the adaptation process comprises scaling the estimated bit error probabilities to match corresponding actual bit error probabilities in order to make the scaled estimated bit error probabilities directly fall into one bit error probability interval of the predefined mapping table, wherein the scaling is based on known region-specific scaling values or scaling tables.

3. The method of claim 1, wherein the adaptation process comprises applying a known region-specific scaled mapping table as the predefined mapping table, wherein the scaled mapping table has bit error probability intervals scaled with respect to the bit error probability intervals of the original predefined mapping table in order for the estimated bit error probabilities to directly fall into one of the bit error probability intervals of the scaled mapping table.

4. The method of claim 1, wherein the adaptation process and information required therein is obtained offline beforehand.

5. The method of claim 1, wherein the available power ratios are divided into at least two known regions.

6. The method of claim 5, wherein at least some of the at least two regions have non-uniform sizes.

7. The method of claim 1, wherein the first and the second set of at least one user terminal receive speech data in a GSM network and apply voice services over adaptive multi-user orthogonal sub-channels-technique.

8. A method for generating adaptation data for performing an adaptation process, the method comprising:

dividing a range of available power ratios between the transmission power of a first sub-channel to a first set of at least one user terminal and the transmission power of a second sub-channel to a second set of at least one user terminal into at least one region; and associating each region with specific adaptation data that is to be applied in the adaptation process when receiving data in a time slot assigned for simultaneous transmission of data to the first set and to the second set in a time-division multiplexing communication protocol.

9. The method of claim 8, further comprising:

applying a power ratio linkable to a certain region in transmission of data to the first and to the second set;

obtaining information on bit error rate probabilities estimated in the user terminal associated with the transmission;

determining actual bit error probabilities corresponding to the estimated bit error probabilities;

generating adaptation data for the region which is linkable to the applied power ratio, wherein the adaptation data is generated on the basis of a comparison between the estimated bit error probabilities and the actual bit error probabilities; and performing the generation of the adaptation data for each of the at least one region thereby associating each region with a region-specific adaptation data.

10. The method of claim 8, wherein the region-specific adaptation data comprises one of the following: scaling values for scaling the estimated bit error probabilities, a scaling table for obtaining the scaled estimates of bit error probabilities, and a scaled mapping table having bit error probability intervals into which the estimated bit error probabilities directly fall with a predetermined probability.

11. The method of claim 8, further comprising: dividing the range of available power ratios into at least two regions.

12. A data communications apparatus operable with a time division multiplexed communications protocol in which data intended for plural user terminals can be simultaneously transmitted in one time slot, the apparatus comprising at least one processor and at least one memory including a computer program code, wherein the at least one memory and the computer program code are configured to, with the at least one processor, cause the apparatus at least to:

receive data during a time slot assigned for simultaneous transmission of data to a first set of at least one user terminal and to a second set of at least one user terminal;

estimate an applied power ratio between the transmission power of a first sub-channel to the first set and the transmission power of a second sub-channel to the second set, wherein available power ratios are divided into at least one known region and each applied power ratio belongs to one region;

estimate a bit error probability for each burst of the received data; and apply an adaptation process in order to make the estimated bit error probabilities fall into one bit error probability interval of a predefined mapping table with a predetermined probability, wherein the bit error probability interval in which the estimated bit error probabilities fall determines the bit error probability that is to be reported to a network and the adaptation process to be applied depends on which region the applied power ratio belongs to.

13. The apparatus of claim 12, wherein the adaptation process comprises scaling the estimated bit error probabilities to match corresponding actual bit error probabilities in order to make the scaled estimated bit error probabilities to directly fall into one bit error probability interval of the predefined mapping table, wherein the scaling is based on known region-specific scaling values or scaling tables.

14. The apparatus of claim 12, wherein the adaptation process comprises applying a known region-specific scaled mapping table as the predefined mapping table, wherein the scaled mapping table has bit error probability intervals scaled with respect to the bit error probability intervals of the original predefined mapping table in order for the estimated bit error probabilities to directly fall into one of the bit error probability intervals of the scaled mapping table.

15. The apparatus of claim 12, wherein the adaptation process and information required therein is obtained offline beforehand.

16. The apparatus of claim 12, wherein the available power ratios are divided into at least two known regions.

17. The apparatus of claim 16, wherein at least some of the at least two regions have non-uniform sizes.

18. The apparatus of claim 12, wherein the first and the second set of at least one user terminal receive speech data in a GSM network and apply voice services over adaptive multi-user orthogonal sub-channels-technique.

19. A data communications apparatus, comprising at least one processor and at least one memory including a computer program code, wherein the at least one memory and the computer program code are configured to, with the at least one processor, cause the apparatus at least to:

divide the range of available power ratios between the transmission power of a first sub-channel to a first set of at least one user terminal and the transmission power of a second sub-channel to a second set of at least one user terminal into at least one region; and associate each region with specific adaptation data that is to be applied in an adaptation process when receiving data in a time slot assigned for simultaneous transmission of data to the first set and to the second set in a time-division multiplexing communication protocol.

20. The apparatus of claim 19, wherein the at least one memory and the computer program code are configured with the at least one processor to cause the apparatus further to:

apply a power ratio linkable to a certain region in transmission of data to the first and to the second set;

obtain information on bit error rate probabilities estimated in the user terminal associated with the transmission;

determine actual bit error probabilities corresponding to the estimated bit error probabilities;

generate adaptation data for the region which is linkable to the applied power ratio, wherein the adaptation data is generated on the basis of a comparison between the estimated bit error probabilities and the actual bit error probabilities; and perform the generation of the adaptation data for each of the at least one region thereby associating each region with a region-specific adaptation data.

21. The apparatus of claim 19, wherein the region-specific adaptation data comprises one of the following: scaling values for scaling the estimated bit error probabilities, a scaling table for obtaining the scaled estimates of bit error probabilities, and a scaled mapping table having bit error probability intervals into which the estimated bit error probabilities directly fall with a predetermined probability.

22. The apparatus of claim 19, wherein the at least one memory and the computer program code are configured with the at least one processor to cause the apparatus further to:

divide the range of available power ratios into at least two regions.

23. A computer program product embodied on a distribution medium readable by a computer and comprising program instructions which, when loaded into an apparatus, cause the apparatus to perform actions for a time-division multiplexed communications protocol in which data intended for plural user terminals can be simultaneously transmitted in one time slot, the actions comprising:

receiving data in a first user terminal during a time slot assigned for simultaneous transmission of data to a first set of at least one user terminal and to a second set of at least one user terminal;

estimating an applied power ratio between the transmission power of a first sub-channel to the first set and the transmission power of a second sub-channel to the second set, wherein available power ratios are divided into at least one known region and each applied power ratio belongs to one region;

estimating a bit error probability for each burst of the received data; and applying an adaptation process in order to make the estimated bit error probabilities fall into one bit error probability interval of a predefined mapping table with a predetermined probability, wherein the bit error probability interval in which the estimated bit error probabilities fall determines the bit error probability that is to be reported to a network, and the adaptation process to be applied depends on which region the applied power ratio belongs to.

* * * * *

UNITED STATES PATENT AND TRADEMARK OFFICE
CERTIFICATE OF CORRECTION

PATENT NO. : 8,345,642 B2
APPLICATION NO. : 13/272790
DATED : January 1, 2013
INVENTOR(S) : Craig J. Mitchell et al.

Page 1 of 1

It is certified that error appears in the above-identified patent and that said Letters Patent is hereby corrected as shown below:

Claim 12 at col. 15, line 39; "predefmed" should be --predefined--.

Signed and Sealed this
Ninth Day of April, 2013

Teresa Stanek Rea
*Acting Director of the United States Patent and Trademark Office*